Figure 1:
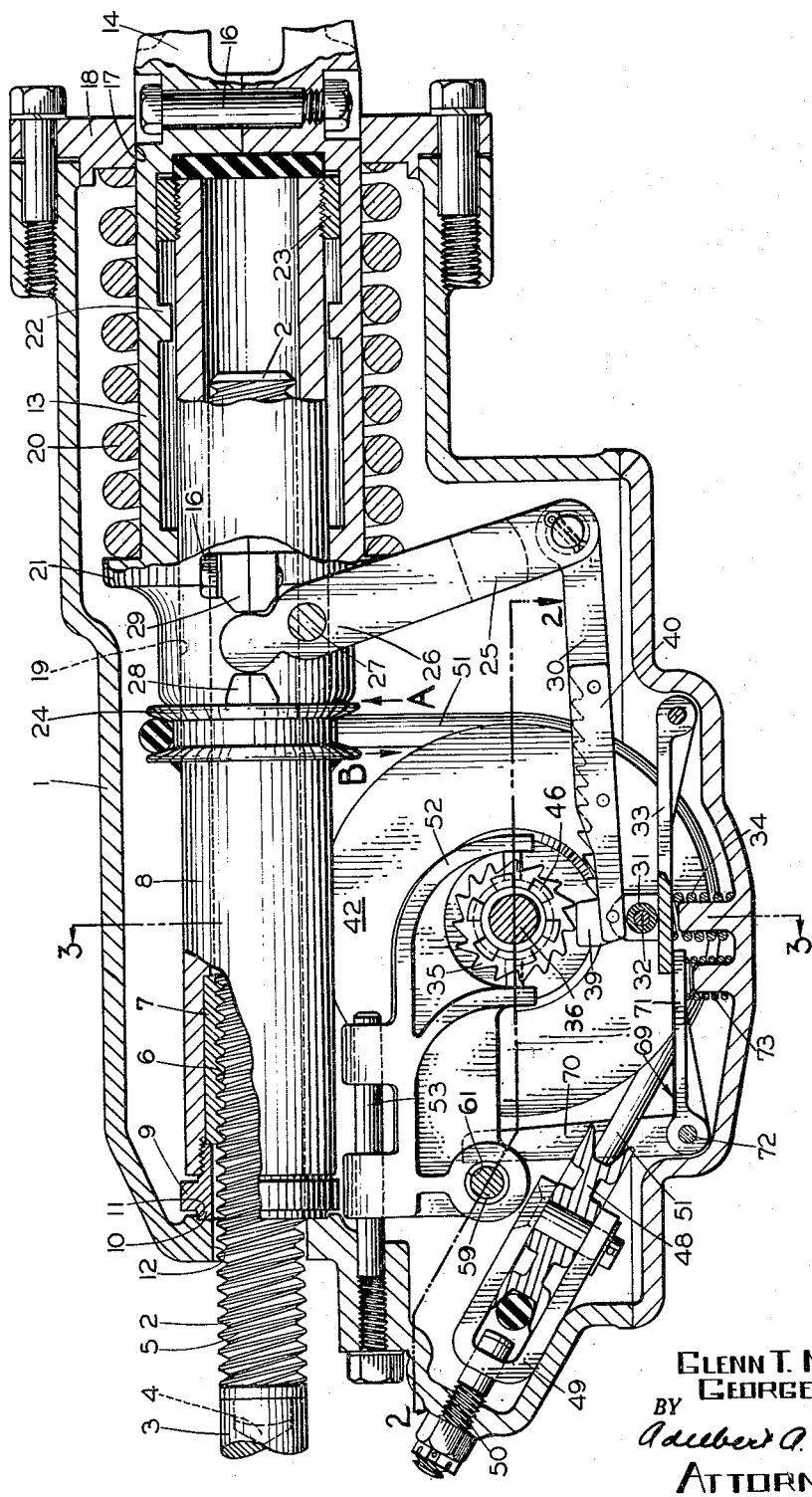

INVENTORS
GLENN T. McCLURE
GEORGE K. NEWELL
BY
Adelbert A. Steinmiller
ATTORNEY

Aug. 29, 1961  G. T. McCLURE ET AL  2,998,104
AUTOMATIC SLACK ADJUSTER

Filed July 2, 1958  3 Sheets-Sheet 3

INVENTORS
GLENN T. McCLURE
BY GEORGE K. NEWELL

ATTORNEY

United States Patent Office 2,998,104
Patented Aug. 29, 1961

2,998,104
AUTOMATIC SLACK ADJUSTER
Glenn T. McClure, McKeesport, and George K. Newell, Trafford, Pa., assignors to Westinghouse Air Brake Company, Wilmerding, Pa., a corporation of Pennsylvania
Filed July 2, 1958, Ser. No. 746,204
12 Claims. (Cl. 188—196)

This invention relates to automatic slack adjusters operable responsively to imposition and relaxation of tension on tension members of the brake rigging on a railway vehicle for effecting automatic adjustment of slack in the rigging and, more particularly, to an improved slack adjuster of the double-acting type in which a greater amount of slack is let out than is taken up incidental to one operation of the adjuster.

Automatic slack adjusters of the double-acting type capable of letting out slack in the brake rigging as well as taking up slack, are well known. Moreover, slack adjusters capable of letting out a large increment of slack by one operation of the adjuster are also well known. A sufficiently large increment of slack let-out is a desirable feature for various reasons. For example, prior to replacement of worn-out brake shoes with new ones, the slack is completely let out by manual operation to facilitate the replacement. The repairman, however, in readjusting the slack after new shoes are installed may take up too much slack and thereby set up a condition wherein the brake shoes would drag against the wheels as the train pulls away. A slack adjuster which lets out a large increment of slack is thus desirable because the dragging condition of the shoes can be eliminated by the first operation of the adjuster rather than by a series of operations as necessitated in the case of slack adjusters which do not let out a sufficiently large increment of slack. The presently known slack adjusters having the desirable feature just described are generally characterized by structural complexity requiring a high degree of close adjustment at all times to assure efficient operation and, therefore, are not only costly to produce but are also susceptible to misadjustment and malfunctioning.

Accordingly, the object of applicants' invention is to provide a slack adjuster characterized by its simplicity in structure and reliability of operation.

The slack adjuster constituting the present invention comprises two pulley wheels axially spaced apart and selectively engageable by a ratchet pinion to effect either a let-out or a take-up of slack depending upon the pulley that is engaged by the pinion, such selection thereby determining the direction in which a slack adjuster screw is turned. The ratchet pinion is rotated in a given direction, regardless of which pulley is engaged, by longitudinal movement of a rack effected, in turn, by axial movement of a tension member connected between live and dead brake levers when the tension thereon is released by releasing the vehicle brakes. The rack is so constructed as to produce a greater amount of rotation of the ratchet pinion when engaged with the pulley that effects slack let-out than when engaged with the other pulley, thereby effecting a greater increment of slack let-out than slack take-up incidental to a respective operation of the slack adjuster. The normal position of the ratchet pinion is in engagement with the one pulley to effect slack let-out. The selective positioning or shifting of the ratchet pinion into engagement with the other pulley for effecting slack take-up is accomplished by a shifting lever operable, in turn, by a fluid pressure operated means to which fluid under pressure is supplied from a port in the brake cylinder wall uncovered by the brake cylinder piston when it overtravels incidental to excessive slack in the brake rigging.

Figure 2:
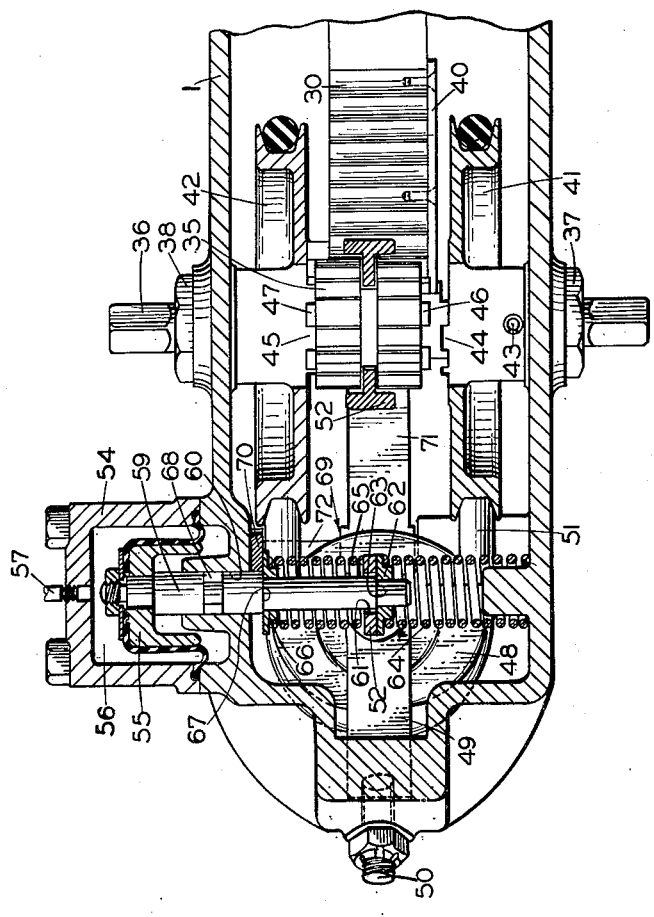
Figure 3:
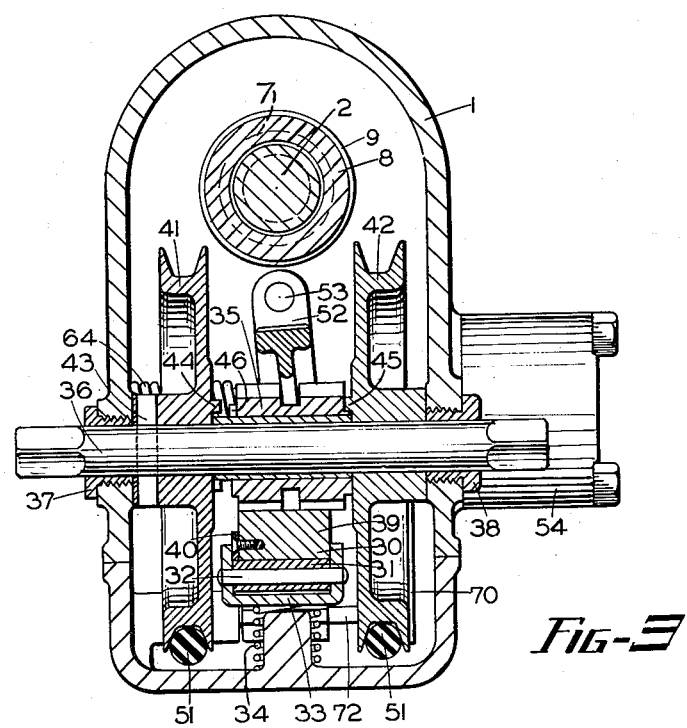
Figure 4:
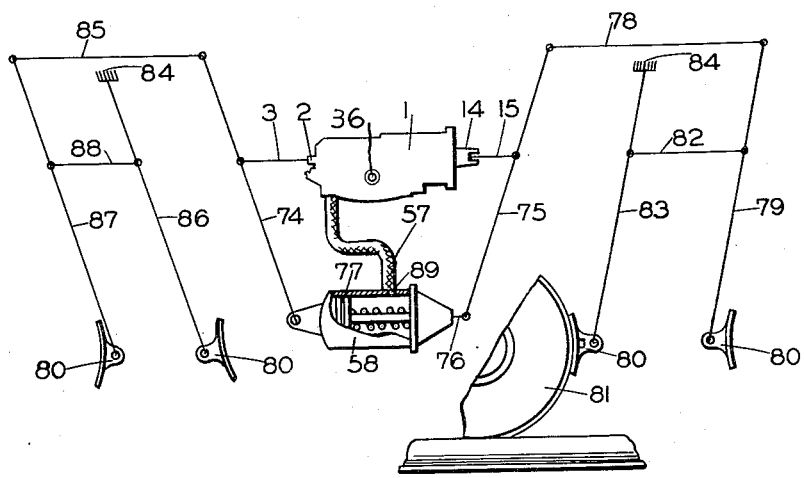

In the drawings FIG. 1 is an elevational sectional view of a slack adjuster embodying the invention; FIG. 2 is a horizontal sectional view of a portion of the slack adjuster taken along a line 2—2 in FIG. 1; FIG. 3 is a vertical sectional view taken along line 3—3 in FIG. 1; and FIG. 4 is a schematic view showing the position of the slack adjuster in a typical brake rigging system of a railway vehicle.

Description

Referring to FIG. 1 of the drawings, the slack adjuster embodying the invention comprises a casing 1 for accommodating the several working parts of said slack adjuster. A threaded pull-rod or screw 2 is horizontally disposed in the upper portion of the casing, as viewed in the drawing, and has one end thereof extending exteriorly of said casing. The exterior end of the screw 2 is attached to a tie rod 3 as by a screw-threaded portion which is screwed into a threaded recess 4 formed in the end of tie rod 3, only a portion of which is shown, forming part of the brake rigging leverage to be more fully described hereinafter.

The screw 2 has screw threads 5 along substantially the entire length thereof, which threads engage internal screw threads 6 formed in a bushing 7 fixedly press-fitted into a recess in one end of an adjusting sleeve-type nut 8. A lock nut 9 screws into the outer end of nut 8 and into contact with the end of the bushing 7 to lock it in place. The adjusting nut 8 is rotatably supported at one end, adjacent the end of pull rod 2 extending out of the casing, by an annular shoulder 10, formed on lock nut 9, rotatable within a counterbore 11 formed internally of casing 1 and surrounding a bore 12 in said casing through which said pull rod extends to the exterior of the casing. The other end of adjusting nut 8 extends coaxially into one end of and is supported by a substantially cylindrical, hollow tension member 13 contained within casing 1 and closed at the opposite end. The outer end of member 13 extends exteriorly of the casing 1 and has a clevis portion 14 by which the member 13 is connected to a tie rod 15 (see FIG. 4) forming a portion of the rigging. The slack adjuster device itself, therefore, is a floating member of the linkage comprising the brake rigging.

The tension member 13, as shown in FIG. 1, comprises two half-sections suitably bolted together, as by a plurality of screws and bolts 16, and provides the tensional connection between rods 4 and 15. One end of tension member 13 is slidably supported and movable in a bore 17 formed in a cap member 18 which closes the end of casing 1 opposite bore 12 while the other end of said tension member has a bore 19 into which the adjusting nut 8 extends, as above noted, to thereby permit sliding contact and axial movement of said tension member relative to said adjusting nut. A spring 20 having one end bearing against cap 18 and the other end against an annular shoulder 21 formed on tension member 13 adjacent the end opposite cap 18, encircles said tension member and is compressible by axial movement thereof in the direction of the right hand as viewed in the drawing. Axial movement of member 13 in the right-hand direction relative to nut 8 is limited by engagement of an internally formed annular shoulder 22 on said member 13 with a stop nut 23 screwed on the end of adjusting nut 8 adjacent cap 18 and, in the direction of the left hand, by engagement of the end of the tension member with a pulley 24 fixed coaxially to the adjusting nut 8, as by welding, for rotation therewith. Pulley 24 is located substantially midway of the ends of the adjusting nut 8.

A lever 25, having clevis arms 26, is pivotally supported on a pair of pins 27 oppositely arranged on the side walls of the casing 1. The pins 27 are located close to the end of the lever comprising the bifurcated portion, thereby providing a level of unequal moment arms. Each of the free ends of arms 26 has a notch therein by which the arms snugly engage between two pairs of lugs 28 and 29 formed on diametrally opposite outer sides of the tension member 13 adjacent the end next to the pulley 23. Upon axial movement of said tension member, the lever 25 will thus be pivoted about the pins 27 in a direction according to the direction of movement of the tension member. The two clevis arms 26 join together at a point intermediate the ends of the lever arm 25 to form a single-arm portion, the end of which is pivotally connected to one end of a ratchet rack 30 disposed substantially in a horizontal position in the lower portion of the casing 1, as viewed in the drawing.

The rack 30 is slidably movable over a roller 31 carried by a pin 32 fixed in a clevis at one end of a lever 33 (see FIG. 3 also) that is pivotally anchored at its opposite end to the casing 1. As seen in FIG. 1, the end of the lever 33 carrying the roller 31 is situated directly below and is biased by a spring 34 toward a ratchet pinion 35 which is freely rotatable and axially movable, within limits, on a shaft 36. Shaft 36 extends through the entire width of the casing and is journaled at opposite ends in bearings 37 and 38 fixed in the opposite casing side walls. The shaft 36 is provided at each of its ends, which are situated exteriorly of the casing 1, with flats to form a substantially square cross section at said ends (see FIGS. 2 and 3) whereby a crank (not shown) may be applied thereto for a purpose to be hereinafter described.

Sufficient space is provided between the roller 31 and pinion 35 to permit the rack 30 to slide therebetween, said roller and rack being biased toward said pinion by the spring 34 acting on and through the lever 33. The rack 30, at the end opposite its pivotal connection to lever 25, is provided with a raised portion or land 39 of somewhat higher elevation than the teeth on rack 30, which land rests against the pinion 35 when said rack and lever are in their extreme right-hand position, in which they are shown in the drawing. The teeth on rack 30 extend over the major portion of the length of said rack, while the remaining portion of said rack adjacent lever 25 is blank, so that should said rack be moved to an extreme left-hand position, as viewed in the drawing, by maximum rotation of lever 25, as determined by engagement of shoulder 22 of tension member 13 with stop nut 23, the pinion 35 would ride over the teeth and up onto the blank portion of said rack. The rack 30 also has fastened to its near side, as viewed in the drawing, a plate 40 extending longitudinally on said rack for the entire length of the teeth. The width of plate 40 varies so that its upper edge, as viewed in the drawing, is below the rack teeth for a portion of its length at the end adjacent boss 39, but tapers to a greater width so that the upper edge elevationally coincides with the tips of the rack teeth for the balance of its length, the latter length being somewhat longer than the first said length. The purpose of plate 40, which will be described in greater detail hereinafter, is to prevent the teeth of pinion 35 from engaging those on rack 30 during the "slack take-up" phase until said pinion and rack occupy a certain relative position as the rack is moved to the right by lever 25. The axial positions of pinion 35 on shaft 36, which are determined by two pullleys 41 and 42 axially fixed in spaced-apart relation on said shaft on opposite sides of said ratchet pinion (see FIGS. 2 and 3), are so spaced that when said pinion is in engagement with pulley 42 as rack 30 is moved to the right by lever 25 (see FIG. 2), but when said pinion is in engagement with pulley 41, it rides over said plate and follows its contour as rack 30 moves to the right. Pinion 35 thus follows the contour of plate 40 until it registers with the narrower width of said plate, at which point rack 30 is moved upwardly, due to the effect of spring 34, to effect engagement of the teeth of the pinion and rack for the remainder of the length of the rack. It will thus be seen that the rotation of pinion 35 is somewhat limited under the above-described conditions to be explained in greater detail hereinafter.

One of the pulleys 41 and 42, in this case pulley 41, is fixed by a pin 43 to shaft 36 for rotation therewith, while the other is freely rotatable on said shaft. Each of pulleys 41 and 42, on their respective hub faces facing the ratchet pinion 35, has respective clutch teeth 44 and 45 formed thereon for engaging, respectively, either clutch teeth 46 or clutch teeth 47 formed on opposite hub faces of pinion 35.

A tension adjusting idler pulley 48 is disposed in a suitable portion of the casing 1 and is rotatably mounted in a yoke 49 which is supported by a screw-threaded bolt 50 screwed into the casing wall and extending exteriorly thereof whereby the tension of a continuous belt 51 passing over said adjusting pulley and over pulleys 24, 41 and 42 may be adjusted by screwing the bolt into or out of the casing wall, as the case may be.

The pinion 35, as above noted, is axially movable on shaft 36 between the pulleys 41 and 42 so as to engage one or the other through the clutches 44—46 or 45—47. Shifting of the pinion 35 between the pulleys 41 and 42 is effected by a shifting fork or lever 52 which is pivotally suspended, perpendicularly to the axis of said pinion or to the axis of shaft 36, on a rod 53 anchored in the casing wall.

By reference to FIG. 2, it will be seen that a supplementary casing portion 54, affixed to the side wall of casing 1, serves to house an operating piston 55 having one side subjectable to pressure of fluid in a pressure chamber 56 which is connected through a conduit 57, only a portion of which is shown, to a brake cylinder 58 (see FIG. 4) in a manner and for a purpose to be hereinafter described. A piston stem 59 extends concentrically from the side of piston 55 opposite pressure chamber 56 into the casing 1 through a bore 60 formed in the casing wall, said piston and stem being so arranged as to be disposed in parallel axial relation to the shaft 36. The stem 59 extends loosely through a bore 61 in the lower portion of shifting lever 52, as viewed in the drawing, to terminate a short distance beyond. A spring seat 62 fits over the end of stem 59 and is fixed against a shoulder 63 formed thereon, while a spring 64 is compressed between said spring seat and the casing wall opposite the wall through which said stem extends. The shifting lever 52 rests against the side of spring seat 62 opposite spring 64. Another spring 65, in opposing relation to spring 64, encircles the stem 59 and is compressed between the shifting lever 52 and a spring seat 66 fixed against a shoulder 67 formed on said stem adjacent the inner side of the casing wall through which the stem extends. The opposing compression forces exerted by springs 64 and 65 serve to maintain shifting lever 52 in a fixed axial position on the stem 59, said shifting lever being movable with said stem upon operation of piston 55, as will later be described, to cause pivotal movement of the shifting lever on rod 53 and thereby shifting of the pinion 35 on the shaft 36.

The stem 59 has an annular groove 68 formed thereon at a point between the piston 55 and shoulder 67. A locking lever 69, adapted to register with and engage the groove 68 in a manner to be hereinafter explained, comprises two arms 70 and 71 substantially at right angles to each other but spaced apart by a pin 72 which is pivotally anchored in the casing wall and to which said arms are keyed for rotation about the axis of said pin as a unit, the axis of said pin being parallel to the axes of shaft 36 and stem 59. Arm 70 occupies a substantially vertical position, as viewed in FIG. 1 of the drawings, with its free end resting against the piston stem 59 just inside the casing wall adjacent spring seat 66. Arm 71 is so spaced from arm 70 as to extend away from pin 72 and have its free end terminate underneath the end of lever 33 carrying the roller 31. A spring 73 serves to bias arm 71 against lever 33 and, therefore, assists spring 34 to bias said lever, and therefore rack 30, against the pinion 35.

FIG. 4 schematically shows a typical brake rigging arrangement for a freight car type railway vehicle with the slack adjuster installed between the two tension rods 3 and 15 which are pivotally connected, respectively, at a suitable point between the ends, to a dead lever 74 and a live lever 75, the live lever 75 having one end pivotally connected to a piston rod 76 of a piston 77 in the brake cylinder 58. It should be understood that the term "live lever" as used hereinafter in the specification and claims refers to that particular lever (75) of the brake rigging connected to piston rod 76 and to which the force of the brake cylinder piston is directly applied for transmittal through the brake rigging to the brake shoes. The other end of said live lever is pivotally connected to one end of a pull rod 78, while the other end of said pull rod is pivotally connected to one end of a brake lever 79 for operating one of a set of brake shoes 80 against a wheel of the car, only a portion 81 of a wheel being shown. One end of a tie rod 82 is pivotally connected to the brake lever 79, at a suitable point between the ends of said brake lever, while the other end is pivotally connected to another brake lever 83 which serves to operate another of the brake shoes 80, the end of said brake lever 83 opposite the end attached to the brake shoe 80 being pivotally anchored to an unsprung portion 84 of the wheel-truck frame. The dead lever 74, connected to the tension rod 3, has one end pivotally connected to a stationary portion of the brake cylinder 58 and is tied in with a linkage system similar to that just described in connection with live lever 75 comprising a pull rod 85, brake levers 86 and 87 and a tie rod 88.

*Operation*

In operation, let it be assumed that the vehicle is in motion with the wheels rolling accordingly and that the operating parts of the slack adjuster are occupying their respective normal positions in which they are shown in the drawings. When the train engineer initiates a brake application, the piston 77 and piston rod 76 of brake cylinder 58 is moved in the direction of the right hand, as viewed in the drawing (FIG. 4), causing a proportionate force to be applied to the pull rods 78 and 85 and transmitted accordingly to the two sets of brake levers 79—83 and 86—87. Tension rods 3 and 15 are thus placed under tension, the amount of such tension depending upon the degree of brake application effected, while the amount of movement or travel of piston 77 and piston rod 76 is an indication of the slack condition of the brake rigging. If piston 77 travels less than the normal expected travel for the degree of brake application initiated, a tightness in the rigging is indicated and the slack adjuster operates as follows to let out slack.

Tension on rods 3 and 15 causes the tension member 13 to be moved to the right out of a normal position in abutment with pulley 24, as viewed in the drawing, against the compression of spring 20 to first take up the lost motion between said tension member and the sleeve 8 until shoulder 22 engages stop nut 23. Such movement of tension member 13 causes lever 25 to be rotated about the pins 27 in a clockwise direction, as viewed in FIG. 1, to cause rack 30 to slide under pinion 35 until said pinion rests on the blank portion of said rack adjacent lever 25. The shape of the teeth on both the pinion 35 and the rack 30 is such that as the rack 30 is moved in a left-hand direction, as viewed in the drawing, said teeth do not mesh to cause rotation of the pinion, which, as above noted, is engaged with one or the other of the pulleys 41 or 42, thereby providing a holding effect on said pinion to prevent it from being rotated as the rack slides under it in the direction indicated.

With the parts of the slack adjuster in their respective positions as immediately above described, the slack adjuster is in a "cocked" condition for letting out slack in the brake rigging, which is effected when the brake application on wheels 81 is released. With release of the brake application, tension on rod 15, and therefore tension member 13, is released to permit spring 20 to return said tension member to its normal position, whereupon lever 25 is rotated about the pins 27 in a counterclockwise direction, as viewed in the drawing, and rack 30 is moved to the right, as viewed in the drawing. As rack 30 moves to the right, the teeth on pinion 35 are engaged by the teeth on said rack to cause rotation of said pinion in a counterclockwise direction, as viewed in the drawing. Since the pinion 35 is not riding on the plate 40, it will be engaged by the entire length of the teeth on rack 30 and, thereby, rotated a corresponding maximum amount. Upon abutment of tension member 13 with pulley 24, rotation of lever 25, and therefore movement of rack 30, ceases, and pinion 35 rides up on land 39, whereupon rotation of said pinion also ceases.

Since pinion 35 is engaged with pulley 42 through clutch 45, 47, as above noted, the counterclockwise rotation of said pinion causes corersponding rotation of pulley 42 on shaft 36 and therefore movement of belt 51 in a direction indicated by arrow A in FIG. 1. Movement of belt 51 in the direction indicated produces corresponding rotation of pulley 24 and therefore nut 8 on screw 2. Since the threads 5 on screw 2 are right-hand threads, rotation of nut 8, as described, effects a let-out of said screw and, therefore, a let-out of slack in the brake rigging.

The amount of let-out of screw 2, of course, depends upon the predetermined pitch of the screw threads 5, the number of teeth on rack 30 that effectively engage the teeth on pinion 35 to produce a predetermined amount of rotation of said pinion and other factors involved in obtaining the desired amount of let-out in brake rigging slack. The dimensions of the present slack adjuster are such as to result in a let-out of approximately three-fourths of an inch of slack, it being understood that said dimensions can be varied to produce different amounts of slack let-out as desired.

It should be understood that if, upon a succeeding brake application, the travel of the brake cylinder piston 77 is still less than the normal amount of travel, the slack adjuster will operate upon release of the brake application, in the manner above described, to let out a predetermined increment or amount of slack and will continue to do so for each succeeding cycle of brake application and release until the piston travel becomes excessive.

If upon initiation of a brake application, the brake cylinder piston 77 overtravels the normal amount of piston travel due to excessive slack in the brake rigging and thereby moves beyond a slack adjuster port 89 formed in the wall of brake cylinder 58 and connected to conduit 57, the slack adjuster operates as follows to take up said excessive slack. When the brake application is initiated, tension member 13 and lever 25 operate, as above described, to move the rack 30 to the left, as viewed in the drawing, until pinion 35 rests on the blank portion of said rack adjacent said lever. Chamber 56 (see FIG. 2) is connected by way of conduit 57 to the slack adjuster port 89 (see FIG. 4) in the brake cylinder 58. The slack adjuster port 89 is so situated in the brake cylinder wall relative to the axis of the brake cylinder as to be normally closed to the pressure volume of said brake cylinder, unless the piston overtravels its normal amount of travel when the brake application is initiated, in which case said port is opened to the pressure volume and fluid under pressure may flow from said brake cylinder, through conduit 57, to chamber 56 in the slack adjuster to act on piston 55. Piston 55 and stem 59 are thereby actuated in a downward direction, as viewed in FIG. 2 of the drawings, out of a normal position defined by abutment of spring seat 66 against arm 70 of locking lever 69 and in which position pinion 35 is engaged with pulley 42, to a different position to cause the shifting lever 52 to be pivoted about rod 53 in a clockwise direction, as viewed in FIG. 3 of the drawings. As shifting lever 52 is so pivoted out of a normal position in which pinion 35 is engaged with pulley 42, said pinion 35 is shifted out of engagement with said pulley 42 into engagement with pulley 41 through clutch 44—46. Movement of stem 59 with piston 55 allows annular groove 68 to register with arm 70 of locking lever 69. At the point of registry, spring 73, acting through arm 71 and pin 72, forces arm 70 into groove 68 to maintain stem 59 and shifting lever 52 immobile, and therefore pinion 35 engaged with pulley 41, until arm 70 is disengaged from groove 68, as will later be described. The slack adjuster is now in a "cocked" condition for taking up slack upon release of the brake application.

When fluid under pressure is released from the brake cylinder 58 and the brake application correspondingly released, tension on rod 15 is also released, and in a manner similar to that described in connection with the "slack let-out" phase, rack 30 is moved to the right with pinion 35 following the contour of plate 40. Therefore, engagement of the teeth of pinion 35 with the teeth of rack 30 is delayed until said pinion registers with the narrower width of said plate, at which point said teeth are effectively engaged to cause rotation of said pinion in a counterclockwise direction, as viewed in FIG. 1, due to movement of said rack. Since only a portion of the teeth on rack 30 engage pinion 35, it follows that a lesser amount of rotation of said pinion occurs as compared to the amount of its rotation during the let-out phase.

Rotation of pinion 35, as just described, causes a corresponding amount of rotation of pulley 41 in the same direction. However, since the rotation is on pulley 41 in a counterclockwise direction, the movement of belt 51 will be opposite to the movement of said belt during the let-out phase, and, therefore, in the direction indicated by arrow B in FIG. 1 of the drawings. The nut 8 therefore, rotated by pulley 24, takes up on screw 2 to effect a take-up of slack in the rigging. The amount of slack take-up during each operation of such take-up phase is calculated to be about one-third the amount of slack let-out of each operation of the let-out phase. As in the case of the let-out phase, the take-up operation ceases when tension member 13 abuts against pulley 24 and pinion 35 rides up on land 39. When pinion 35 rides up on land 39, said land is depressed downwardly, as viewed in the drawing, and thereby correspondingly depresses lever 33 and arm 71 against the biasing forces of the respective springs 34 and 73. Depression of arm 71 causes rotation of lever 69 about pin 72, in a clockwise direction, which causes lever 70 to be dislodged from groove 68 on piston stem 59.

When fluid under pressure is released from the brake cylinder 58 to effect a brake release, the piston 77 moves back over the slack adjuster port 89 to permit fluid pressure in chamber 56 acting on piston 55 to be released, whereby spring 64, with arm 71 disengaged from groove 68, is effective for moving said piston stem and piston 55 to their normal position, during which movement the shifting fork 52 acts to shift pinion 35 out of engagement with pulley 41 and back into engagement with pulley 42.

With each successive cycle of brake application and release, the slack adjuster operates automatically in response to the amount of travel of piston 77 of the brake cylinder 58 to either take up or let out slack, if necessary, until the piston travel approaches normal.

The shaped or square ends of shaft 36 permit use of a crank for manually adjusting the brake rigging slack as is necessary, for example, after having replaced worn-out brake shoes 80 with new ones or after having replaced or repaired any portion of the brake rigging which would disturb the slack adjustment out of normal. It will now be seen that by having pulley 41 fixed to shaft 36 by pin 64, movement of belt 51 may be effected either in the direction of arrow A or arrow B, when shaft 36 is rotated by a hand crank or lever (not shown), either in a clockwise or counterclockwise direction, respectively, as viewed in FIG. 1, thereby manually causing corresponding rotation of screw 2 to either let out or take up slack, as the situation demands. It should be noted that during manual adjustment of slack in the rigging, in the manner just described, the position of ratchet pinion 35 relative to pulleys 41 and 42 is immaterial. If ratchet pinion 35 is clutched to pulley 42, for example, shaft 36 is free to turn relative to said pinion and pulley, whereas if said ratchet pinion is clutched to pulley 41, which is pinned to said shaft, said pinion will simply rotate with said shaft and pulley 41 while riding on the land 39, thereby permitting manual adjustment to be effected without interference with or from the other parts of the adjuster.

Having now described the invention, what we claim as new and desire to secure by Letters Patent, is:

1. A double-acting slack adjusting device for connection between a live lever and a dead lever of a railway car brake rigging, and subject to tensional forces resulting from the application of braking forces to said levers incidental to a brake application, said adjuster device comprising a screw member subjectable to said tensional forces, a tension member subjectable to said tensional forces, an internally threaded sleeve member into and out of which said screw member screws to take up or let out slack respectively, said tension member having limited lost motion connection with said sleeve member, spring means yieldingly resisting relative movement of said tension member and sleeve member upon exertion of said tensional forces and restoring said tension and sleeve members to their normal relative positions when the tensional forces are relaxed, ratchet means operable responsively to movement of said tension member relative to said sleeve member resulting from relaxation of said tensional forces, and belt and pulley means operatively connecting said sleeve member with said ratchet means and being operable by said ratchet means for effecting rotation of said sleeve member thereby to effect adjustment between said screw member and said tension member.

2. A double-acting slack adjusting device as set forth in claim 1, wherein the ratchet means comprises a ratchet pinion cooperating with a rack, said ratchet pinion being selectively shiftable, relative to said rack to one position, in which said ratchet pinion engages the teeth over the entire length of the rack, and to another position, in which said pinion effectively engages the teeth over a predetermined portion only of said rack, for effecting a larger degree of relative movement between said sleeve and said screw and a corresponding larger adjustment therebetween when in said one position, responsive to relaxation of the tensional forces, when slack let-out occurs as compared to slack takeup when said ratchet pinion is in its other position, and fluid pressure responsive means operable in response to pressure of fluid and to relief of such for selectively shifting said ratchet pinion between its two positions.

3. A double-acting slack adjuster device for connection between a live lever and a dead lever of a brake rigging for railway cars, and subject to tensional forces resulting from the application of braking forces to said levers, said adjuster device comprising a screw member subjectable to said tensional forces, an internally threaded sleeve member into and out of which said screw member screws by rotation of said sleeve member, a cylindrical tension member subjectable to said tensional forces and slidable on said sleeve member, means biasing said tension member into one position axially with respect to said sleeve member and yieldingly resisting relative movement of the tension member relative to the sleeve member upon exertion of said tensional forces on said screw member and tension member, belt and pulley means for rotating said sleeve member, said belt and pulley means including a pulley rigidly fixed to said sleeve member for rotation therewith and a belt riding on said pulley for causing rotation thereof and thereby rotation of the sleeve member, ratchet pinion means selectively connectable to said belt and pulley means to cause rotation of said sleeve selectively in opposite directions through said belt and pulley means, rack means engageable with said ratchet pinion means and effective to cause rotation of said ratchet pinion means and via said belt and pulley means consequent rotation of said sleeve member, and means connecting said tension member and rack member to cause movement thereof to effect rotation of said ratchet pinion responsively to movement of said tension member relative to said sleeve member when tensional forces on the tension member are relaxed.

4. A double-acting slack adjuster as claimed in claim 3, wherein said rack member is further characterized by a cam plate carried thereby for preventing effective engagement of a certain portion of the rack teeth by the ratchet pinion during rotation of the sleeve in one direction to cause different degrees of rotation of said ratchet pinion in response to the same degree of movement of said rack member dependent upon whether said ratchet member produces one direction of rotation of said sleeve or the opposite direction thereof.

5. In a slack adjuster device for use on a railway vehicle for adjusting the condition of slack in the vehicle brake rigging having a dead lever and a live lever controlled and subjected to tensional forces exerted by a brake cylinder device when effecting a brake application, said dead lever having pivotally connected thereto, between its ends, one end of a first tie rod and said live lever having similarly connected thereto one end of a second tie rod, said slack adjuster being tensionally suspended by said tie rods between said dead lever and said live lever and comprising, in combination, an axially movable male screw-threaded member subjectable to said tensional forces, a rotatable female screw-threaded member engaged with and for effecting axial movement of said male member by rotation of the female member, a tension member coaxially carried by said female member in axially spaced-apart relation to said male screw-threaded member and being subjectable to said tensional forces, whereby said male member, female member and tension member constitute a lineal tensional connection for supporting the slack adjuster device, said tension member having limited axial movement relative to said female member in response to said tensional force exerted on said tension member, directionally reversible pulley means operable in one direction for rotating said female member in a corresponding direction in which said male member is axially moved in a certain lineal direction to lengthen said spaced distance between it and the tension member and operable in the opposite direction for rotating said female member in the opposite rotative direction in which said male member is axially moved in the opposite lineal direction to shorten said spaced distance, said pulley means including two pulleys having respective hub faces axially spaced apart and each provided with clutch teeth, a ratchet pinion coaxially disposed between said two pulleys and having clutch teeth on its hub faces cooperable with said teeth on one or the other of said pulleys, said pinion being shiftable between said pulleys to engage, in one position, said one pulley in which rotation of said ratchet pinion in a given direction results in rotation of the pulley means in one direction, and to engage said other pulley, in another position, in which the direction of rotation of the pulley means is reversed, a rack member cooperating with said ratchet pinion and effective upon axial movement in response to axial movement of said tension member to effect rotation of the ratchet pinion in said given direction, and fluid pressure responsive means operable in response to pressure of fluid and to relief of such pressure for selectively shifting said ratchet pinion between its two positions.

6. The combination defined in claim 5 wherein the pulley means comprises a pulley fixed to the rotatable female member for rotation therewith, two pulleys axially fixed in spaced-apart relation on a shaft and angularly displaceable relative to each other, the ratchet pinion being axially shiftable on said shaft between said pulleys to engage one or the other as effected by the fluid pressure responsive means, an idler pulley, and a continuous belt threaded over all said pulleys to effect operation thereof in one direction or the other, as a unit, upon rotation of said ratchet pinion depending upon which pulley is engaged by the pinion.

7. The combination defined in claim 5 further characterized by a lever having one end pivotally connected to one end of said rack member and the other end pivotally engaged with the tension member and movable therewith upon axial movement thereof, said lever being fulcrumed at a predetermined point between its two ends whereby, for a given amount of axial movement of the tension member, said rack will be moved axially a proportionate amount to effect a predetermined amount of rotation of the ratchet pinion for operating the pulley means.

8. The combination defined in claim 5 wherein the tension member, when subjected to said tensional forces, is axially movable in one direction and, when relieved of such tensional forces, is axially movable in a direction opposite to its said one direction, said combination being further characterized by spring means for biasing said tension member in its said opposite direction and a lever connecting said tension member to said rack member, said lever being effective, upon axial movement of said tension member in its said one direction, for axially moving said rack member in one direction without effecting rotation of said ratchet pinion and effective, upon axial movement of said tension member, in its said opposite direction, for axially moving said rack member in an opposite direction to cause corresponding rotation of said ratchet pinion.

9. The combination defined in claim 8 wherein the ratchet pinion and rack member each have cooperating teeth effectively engageable only during axial movement of said rack member in its said opposite direction for causing rotation of said pinion, said rack member being further characterized by a cam plate axially fixed to one side thereof and being so disposed as to prevent effective engagement of a certain portion of said rack teeth with said pinion teeth during axial movement of said rack member in its said opposite direction when said ratchet pinion is shifted to one of its said two positions by the fluid pressure responsive means, whereby the resulting amount of rotation of said pinion will be less than when said pinion occupies its other position to respectively cause less lineal movement of the male member in the direction in which the spaced distance between it and the tension member is shortened than in the direction in which said spaced distance is lengthened.

10. The combination defined in claim 6 wherein the fluid pressure responsive means comprises an operating piston subjectable to and axially movable by pressure of fluid, a piston stem coaxially movable with said operating piston, a shifting lever operable by said axial movement of said operating piston and piston stem out of a normal position, in which the ratchet pinion is engaged with one of said two pulleys, to a different position for disengaging said one pulley and engaging the other, and spring means for restoring said piston, piston stem and shifting lever to their normal positions upon relief of fluid pressure from said operating piston.

11. The combination defined in claim 10, further characterized by latching means engageable with said piston stem upon said axial movement of said piston and piston stem for latching and retaining said piston stem in a fixed position in which the shifting lever is retained in its different position, and lever means associated with said latching means and operable by the rack member, upon termination of its axial movement, for releasing said piston stem from said fixed position.

12. In a slack adjuster device for adjusting the condition of slack in the brake rigging of a railway vehicle having a dead lever, a live lever, a first tie rod having one end pivotally connected to a point between the ends of said dead lever, and a second tie rod axially spaced apart from said first tie rod and having one end pivotally connected to a point between the ends of said live lever which levers are all subjectable to tensional forces exerted thereon and relieved therefrom by braking forces exerted by a brake cylinder device during brake application and release thereof, respectively, said slack adjuster device being tensionally interposed between said tie rods and comprising, in combination, a casing for housing the operative components of the slack adjuster device, an axially movable male screw member subjectable to said tensional forces, a female screw member engaged with said male member and rotatable in one direction for causing axial movement of said male member in one direction and rotatable in an opposite direction for effecting axial movement of said male member in a direction opposite to said one direction, a first pulley fixed to said female member for rotation therewith, a shaft rotatably supported by said casing transversely to said male member, a second pulley rotatably carried on said shaft, a third pulley axially spaced apart on said shaft from said second pulley in free rotative relation thereto, an idler pulley rotatably supported in said casing, a continuous belt threaded over said pulleys whereby rotation of one pulley, in either one rotative direction or the other, effects rotation of all the pulleys as a unit in a corresponding direction and therefore rotation of said female member accordingly, a ratchet pinion rotatably supported on said shaft and axially shiftable thereon between two positions between said second and third pulleys, said pinion having clutch members formed on opposite hub faces selectively engageable with one or the other of cooperative clutch members formed on the adjacent hubs of said second and third pulleys, depending upon which of its two positions said pinion is occupying, for effecting rotation of said pulleys through said belt upon rotation of the pinion, a shifting lever for shifting said ratchet pinion on said shaft, a fluid pressure operable piston member having a piston stem to which said shifting lever is operatively connected, said piston member and stem having a normal position in which said shifting lever occupies a corresponding position for maintaining said ratchet pinion in one of its said two positions in engagement with said second pulley and being operable responsively to fluid pressure to a different position for causing said shifting lever to move said ratchet pinion to the other of its said two positions in engagement with said third pulley, an axially movable rack member having teeth cooperating with teeth formed and said ratchet pinion, said teeth being ineffective, when said rack member is moved axially in one direction, and being effective for rotating said pinion when said rack member is moved axially in the opposite direction, said rack member having fixed thereto a cam plate effective when said ratchet pinion is in its said other position for preventing engagement of a portion of said rack and pinion teeth during axial movement of said rack in its said opposite direction whereby a lesser amount of rotation of said pinion is effected when in its said other position than when in its said one position, a tension member subjectable to said tensional forces and carried by said female member in axially aligned, spaced-apart relationship to said male screw member and a non-rotative relationship to the female member, said tension member having limited axial movement relative to the female member in one direction responsively to a predetermined tensional force placed on the tension member, spring means for biasing said tension member in a direction opposite to its said one direction, and a lever having one end pivotally connected to said tension member and the opposite end pivotally connected to one end of said rack member, said lever being fulcrumed at a predetermined point between its ends whereby upon said axial movement of said tension member in its said one direction, said rack member is caused to be moved a proportionate amount in its said one direction, and upon axial movement of said tension member in its said opposite direction, said rack member is caused to be moved in its opposite direction for effecting rotation of said ratchet pinion and of said pulleys in one direction or the other, depending upon which of its said two positions said pinion is occupying, to cause rotation of said female member and thereby axial movement of said male member in a corresponding direction for correspondingly lengthening or shortening the spaced apart distance between said male member and said tension member.

References Cited in the file of this patent

UNITED STATES PATENTS

| | | |
|---|---|---|
| 636,874 | Wands | Nov. 14, 1899 |
| 1,479,701 | Djurson | Jan. 1, 1924 |
| 1,837,473 | Neveu | Dec. 22, 1931 |
| 2,109,036 | Schwentler | Feb. 22, 1938 |
| 2,203,890 | Browall et al. | June 11, 1940 |
| 2,283,966 | Brown | May 26, 1942 |
| 2,646,140 | Dorey | July 21, 1953 |
| 2,648,408 | Martin | Aug. 11, 1953 |
| 2,747,700 | Daly | May 29, 1956 |